(12) United States Patent
Liu

(10) Patent No.: US 10,533,672 B2
(45) Date of Patent: Jan. 14, 2020

(54) INFLATION DEVICE

(71) Applicant: Guangdong Travelmall Health Technology Co., Ltd., Dongguan (CN)

(72) Inventor: Zhiming Liu, Dongguan (CN)

(73) Assignee: GUANGDONG TRAVELMALL HEALTH TECHNOLOGY CO., LTD., Dongguan (CN)

( * ) Notice: Subject to any disclaimer, the term of this patent is extended or adjusted under 35 U.S.C. 154(b) by 263 days.

(21) Appl. No.: 15/385,055

(22) Filed: Dec. 20, 2016

(65) Prior Publication Data
US 2017/0102081 A1   Apr. 13, 2017

(30) Foreign Application Priority Data

Sep. 30, 2016 (CN) .......................... 2016 1 0877481

(51) Int. Cl.
| | |
|---|---|
| *F16K 15/20* | (2006.01) |
| *F16K 17/168* | (2006.01) |
| *F16K 15/18* | (2006.01) |

(52) U.S. Cl.
CPC .......... *F16K 15/207* (2013.01); *F16K 15/185* (2013.01); *F16K 17/168* (2013.01)

(58) Field of Classification Search
CPC .......... F04B 33/00; F04B 35/06; F04B 37/10; F04B 39/10; F04B 39/102; F04B 45/00; F04B 45/02; F04B 45/0336; F04B 45/06; F04B 49/22; F04B 49/225; F04B 53/102–1035; F04B 53/1085; F04B 53/1087; F04B 53/1092; F04B 53/1095; F15B 15/19; F16K 15/185; F16K 15/207; F16K 17/168; F16K 15/02; F16K 15/14; F16K 17/30

See application file for complete search history.

(56) References Cited

U.S. PATENT DOCUMENTS

| | | | | |
|---|---|---|---|---|
| 2,690,757 A | * | 10/1954 | Orchowski | F16K 15/20 137/226 |
| 4,056,121 A | * | 11/1977 | Gerdes | B60K 15/03519 137/541 |
| 5,226,793 A | * | 7/1993 | Stovall | F04B 33/00 417/437 |
| 7,644,724 B2 | * | 1/2010 | Chaffee | A47C 27/082 137/223 |
| 2007/0071623 A1 | * | 3/2007 | Chang | F04B 33/00 417/480 |
| 2009/0084447 A1 | * | 4/2009 | Henkel | A61F 2/26 137/12 |

* cited by examiner

*Primary Examiner* — Bryan M Lettman
*Assistant Examiner* — Charles W Nichols
(74) *Attorney, Agent, or Firm* — Shimokaji IP

(57) ABSTRACT

An inflation device includes an airbag and an air valve. An air inlet is provided at an upper end of the air valve, an air outlet is provide at a lower end of the air valve, an inlet valve that is unidirectionally opened. inwards the air valve is provided at the air inlet, the inlet valve can be opened to a deflation position, an outlet valve is provided at the air outlet that is unidirectionally opened outwards the air valve, a push aim extending towards the outlet valve is configured in the air valve and is movable up and down, the push arm is actuated to move towards the outlet valve if the inlet valve is opened, and is pressed against the outlet valve if the inlet valve is at the deflation position. The deflation operation of the inflation device is simple due to the configuration of the push arm.

7 Claims, 12 Drawing Sheets

INFLATION DEVICE

RELATED APPLICATIONS

This application claims the benefit of priority to Chinese Invention Application No. 201610877481.3, filed Sep. 30, 2016, which is hereby incorporated by reference in its entirety.

FIELD OF THE INVENTION

The invention relates to an inflation device, and more particularly to an inflation device that has a simple deflation operation.

BACKGROUND OF THE INVENTION

Inflation products such as inflation toys, swing rings, inflation pillows or inflation mattresses will be deflated when not in use, so as to reduce the size to store and carry conveniently. While in use, the products needs to be inflate. The original inflating way is to directly blow air to the product by using the mouth; apparently, such a way is inefficient and unhealthful. Another way is to use an inflation tool such as an inflator to save time and effort, but such an inflator is inconvenient to carry. Currently, an inflation device that is installed in the inflation product is developed, such a device includes an air valve and an airbag, the air valve is provided with an air inlet and an air outlet at the top and bottom which are formed with a resilient wafer respectively. The product will be inflated by repeatedly pressing the airbag, specifically, when the top resilient wafer is opened, the air enter the airbag and then the bottom resilient wafer will be opened to allow the air enter the product. However, such a device has an inconvenient deflation operation, finger must push the top resilient wafer and insert deep into the air valve to reach the bottom resilient wafer.

Therefore, there is a need for providing an improved inflation device that has a simple deflation operation, to overcome the above-mentioned drawbacks.

SUMMARY OF THE INVENTION

One objective of the present invention is to provide an improved inflation device that has a simple deflation Operation, To achieve the above-mentioned objective, the present invention provides an inflation device comprising an airbag and an air valve. An air inlet is provided at an upper end of the air valve, an air outlet is provide at a lower end of the air valve, an inlet valve that can be unidirectionally opened inwards the air valve is provided at the air inlet, the inlet valve can be opened to a deflation position, an outlet valve is provided at the air outlet that can be unidirectionally opened outwards the air valve, a push arm extending towards the outlet valve is configured in the air valve and is movable up and down, the push arm is actuated to move towards the outlet valve if the inlet valve is opened, and the push arm is pressed against the outlet valve if the inlet valve is at the deflation position, In comparison with the prior art, the push arm of the inflation device is extended towards the outlet valve, when the inlet valve is pressed to an deflation position, the push arm will press against the outlet valve; when the press on the inlet valve is kept on, the outlet valve will be opened under the action of the push anti to communicate the air inlet and the air outlet, thus the air in the product can be released. By this token, the deflation just needs a light press motion applied on the inlet valve, there is no need to insert the finger deep into the air valve, thus the deflation process is simplified by comparison with the prior art.

Preferably, a special-shape spring is configured in the air valve, the special-shape spring comprises a spring body and the push arm, one end of the push arm is fixed on the spring body, and another end of the push arm is extended towards the outlet valve, the spring body is compressed if the inlet valve is opened.

Preferably, the spring body is a helical structure. With such a structure, the spring body is easy to be compressed and restored.

Preferably, a lower end of the spring body is fixed on the air valve, and an upper end of the spring body is extended towards the inlet valve and resiliently pushed against the inlet valve.

Preferably, the push arm is inverted L-shaped. With such a structure, the extending part is far from the spring body, which may not interfere in the motions of the spring body.

Preferably, a guiding recess is extended up and down and runs through the air valve, and the push arm is inserted into the guiding recess.

Preferably, a press portion that is protruded is provided at a top of the inlet valve. Since the press portion is protruded on the top of the inlet valve, thus three applied to the press portion is smaller than that applied to the inlet valve itself, therefore the operation is simplified.

Preferably, the inlet valve includes a resilient wafer, and one end of the resilient wafer is fixed on the air valve, another end of the resilient wafer has a shape that is corresponding to the air inlet. The structure of the resilient wafer is simply, cost-low, and can be opened automatically when negative pressure is generated in the airbag.

Preferably, the outlet valve is a sealing plate that is resilient, the sealing plate has a shape that is corresponding to the air outlet, the air valve includes a fixing holder that is located at the air outlet, and the middle position of the sealing plate is fixed on the fixing holder. When the airbag is compressed, the rim of the sealing plate will be pushed to open downwards, so that air will enter the product through the air outlet. When no positive pressure is generated in the airbag, the sealing plate will be restored to seal the air outlet.

Preferably, the air valve comprises a top valve body and a bottom valve body, the air inlet and the inlet valve are configured in the top valve body, and the air outlet and the outlet valve are configured in the bottom valve body.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
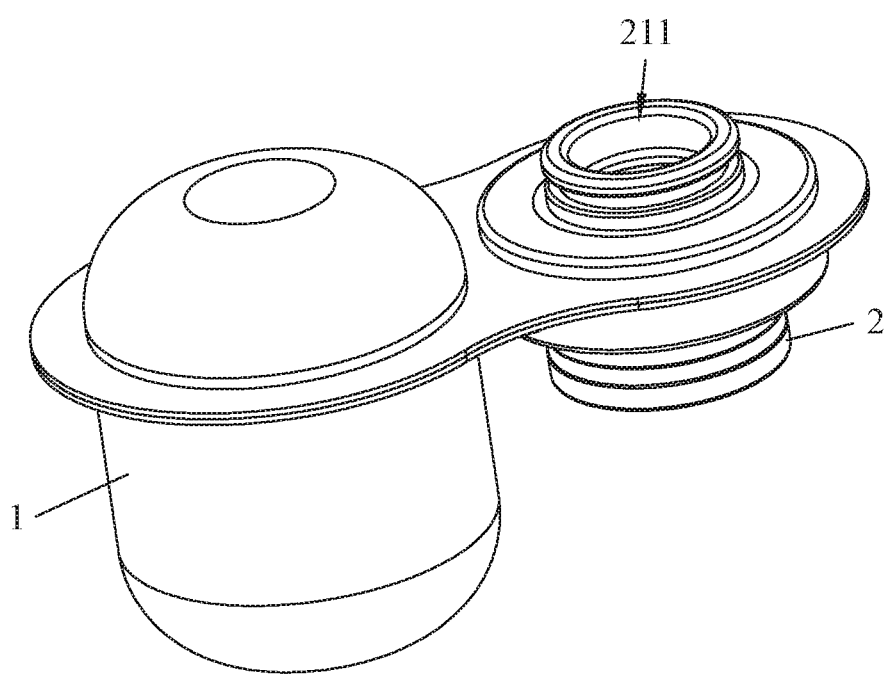
FIG. 1 is a perspective view of an inflation device according to the present invention.

Referring to FIGS. 1 to 5, the present invention provides an inflation device, which can be mounted on the inflation products to inflate efficiently and can be deflated by simple operation.

The inflation device includes an airbag 1 and an air valve 2 communicated one another, and a special-shape spring 3 configured in the air valve 2. The airbag 1 is a hollow structure, an air cavity 20 is configured in the air valve 2, and an air passage 11 is configured between the airbag 1 and the air valve 2, in such a way, the airbag 1 is communicated with the air cavity 20. An air inlet 211 and an inlet valve are configured at the upper portion of the air valve 2, and the inlet valve is a check valve that only allows air to enter the air valve 2 unidirectionally; an air outlet 221 and an outlet valve are configured at the lower portion of the air valve 2, and the outlet valve is a check valve that only allows air to go out of the air valve 2 unidirectionally. The airbag 1 is made of flexible and soft material, such as TPE, by pressing the airbag 1, air can be introduced through the air inlet 211 and go into the product through the air outlet 221. Detailed inflation and deflation principles will be explained thereinafter.

Figure 4:
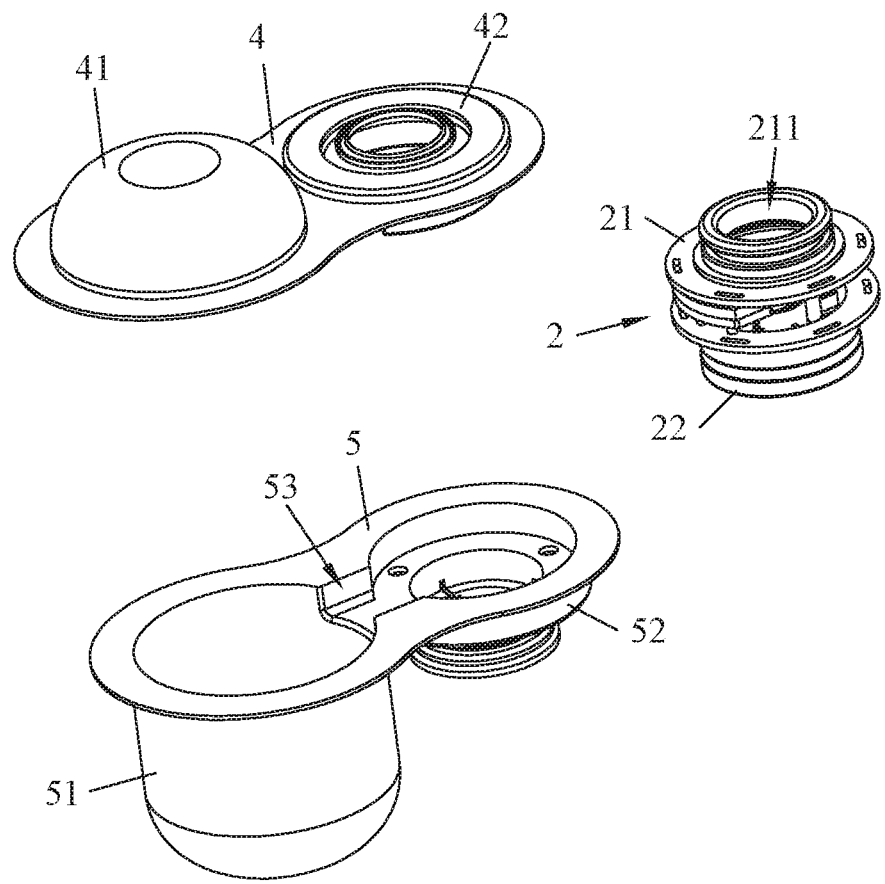
FIG. 4 is an exploded view of the inflation device.

Referring to FIG. 4, the inflation device includes a top cover 4 and a. bottom cover 5, one end of the top cover 4 is provided with a top protrusion 41 that is hollow, and the other end of the top cover 4 is provided with a top surround 42; one end of the bottom cover 5 is provided with a bottom protrusion 51 that is hollow, and the other end of the bottom cover 5 is provided with a bottom surround 52. Furthermore, the bottom cover 5 includes a recess 53 this is communicated with the bottom surround 52 and the bottom protrusion 51. Specifically, the top cover 4 is oppositely connected with the bottom cover 5 hermetically, and the top surround 42 and the bottom surround 52 are configured around the air valve 2 hermetically. More specifically, the top cover 4 is oppositely connected with the bottom cover 5 to form the airbag 1, the hermetical recess 53 forms the air passage 11, and the air valve 2 is sealed by the top surround 42 and the bottom surround 52 to form the air cavity 20. As mentioned above, to make the airbag 1 have elasticity, the top cover 4 and the bottom cover 5 are made of flexible and soft material.

Figure 5:
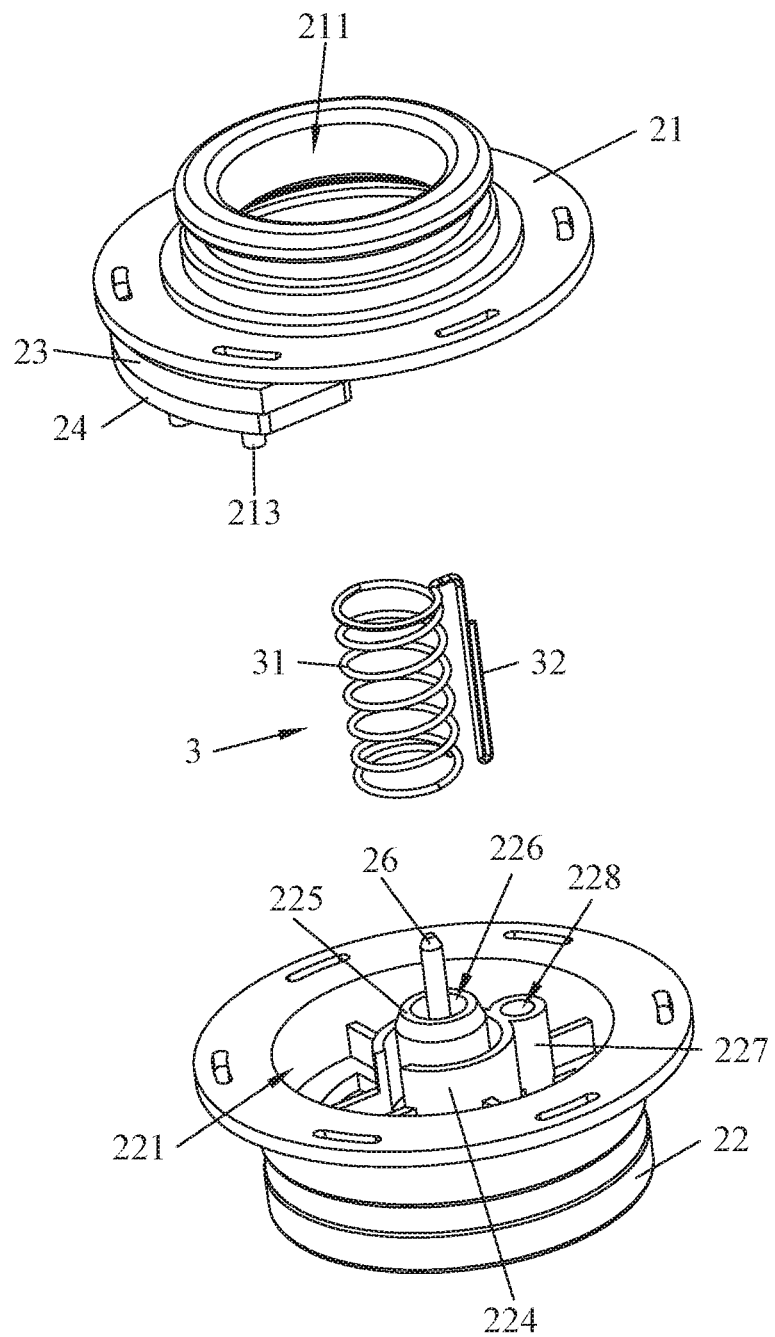
FIG. 5 is an exploded view of the valve.

As shown in FIG. 5, the air valve 2 includes a top valve body 21 and a bottom valve body 22, and the special-shape spring 3 is configured between the top valve body 21 and the bottom valve body 22.

Figure 6:
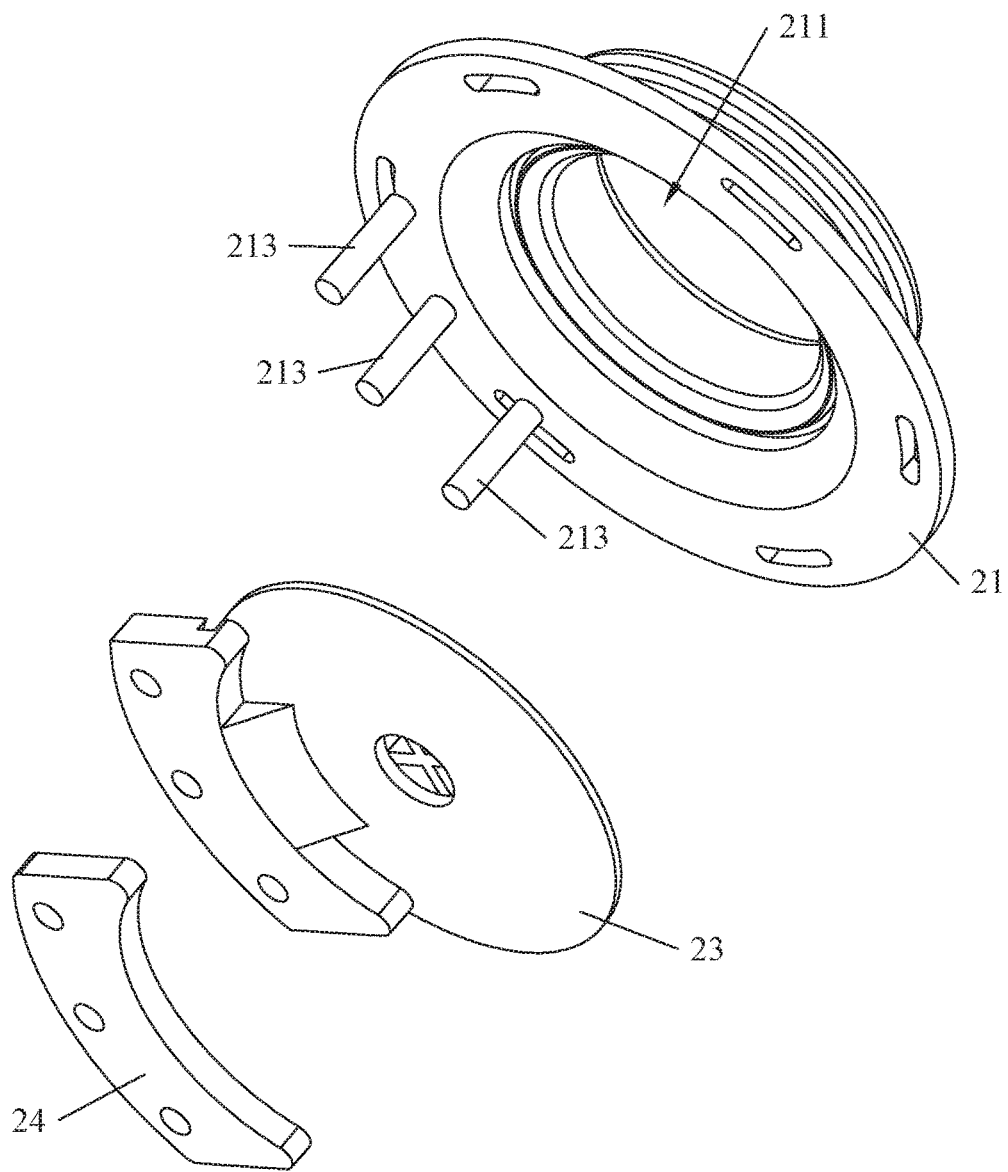
FIG. 6 is a structure view showing the top valve, inlet valve and the pressing plate.
Figure 7:
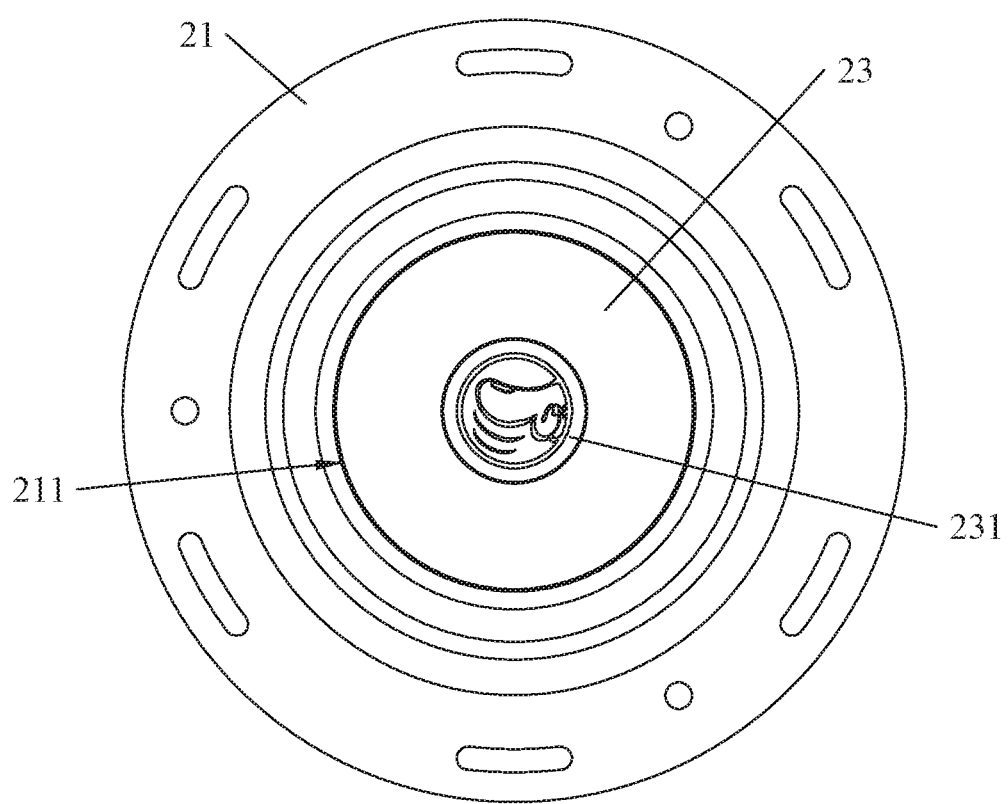
FIG. 7 is a top view of the top valve.

Referring to FIGS. 5-7, the air inlet 211 is configured on the top valve body 21 and runs through the top valve body 21 along the up and down directions. Specifically, the inlet valve is a resilient wafer 23 that is resilient, one end of the resilient wafer 23 is fixed on three fixing protrusions 213 arranged on the bottom of the top valve boy 21, and the other end of the resilient wafer 23 has a shape that is corresponding to the air inlet 211, such as the shape is circular, thereby sealing the air inlet 211. To ensure the tightness, the edge of the resilient wafer 23 at the other end can be formed a. chamfer. The air valve 3 further includes a pressing plate 24 which is fixedly connected to the fixing protrusion 213 and pressed against the fixing end of the resilient wafer 23, thereby stabilizing the connection between the resilient wafer 23 and the air inlet 211.

Referring to FIG. 7, a press portion 231 is provided at a top of the resilient wafer 23, as shown in the top view of the top valve body 21, the press portion 231 is located at the middle position of the air inlet 211. Preferably, an icon is shown in the press portion 231, specifically is a thumb indicating a press motion.

Figure 3:
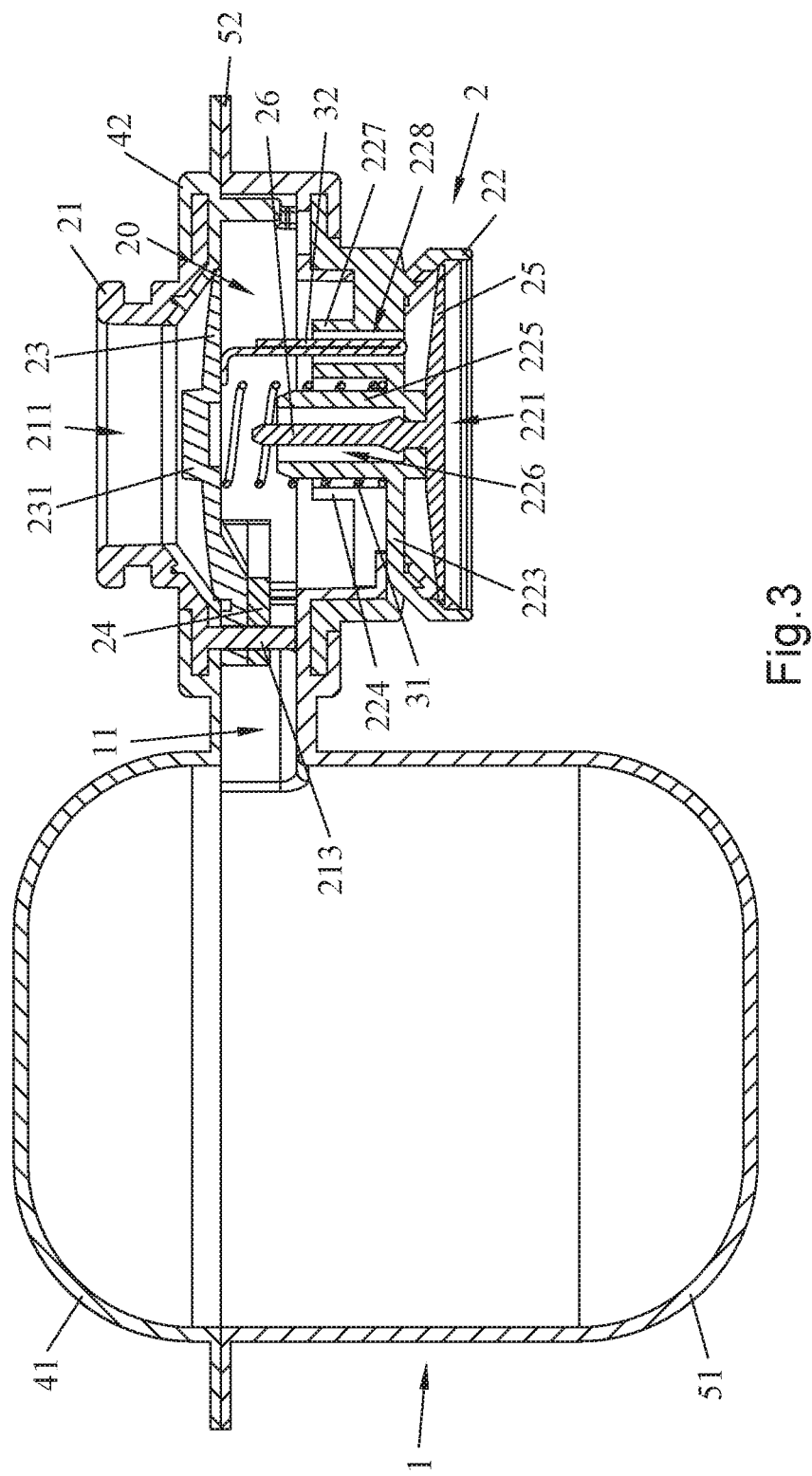
FIG. 3 is a sectional view of the inflation device.
Figure 8:
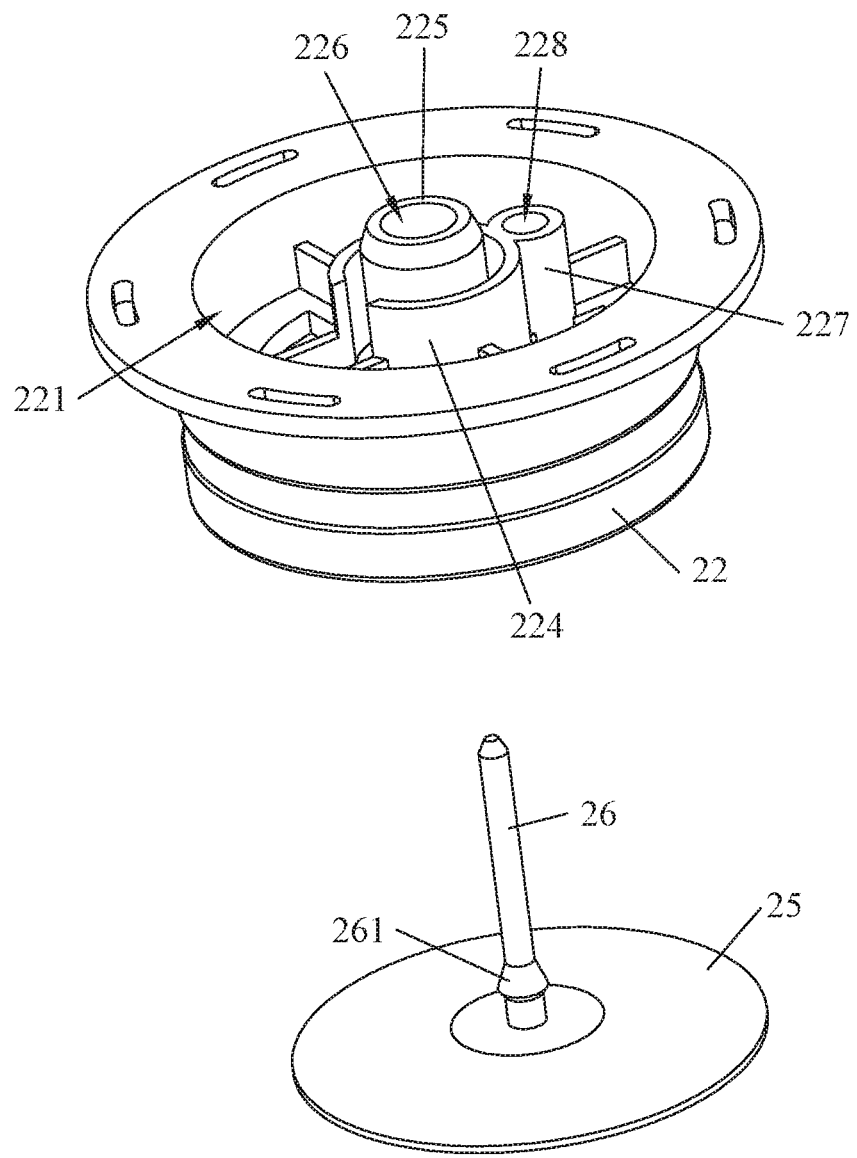
FIG. 8 is a structure view showing the bottom view and. the outlet valve.
Figure 9:
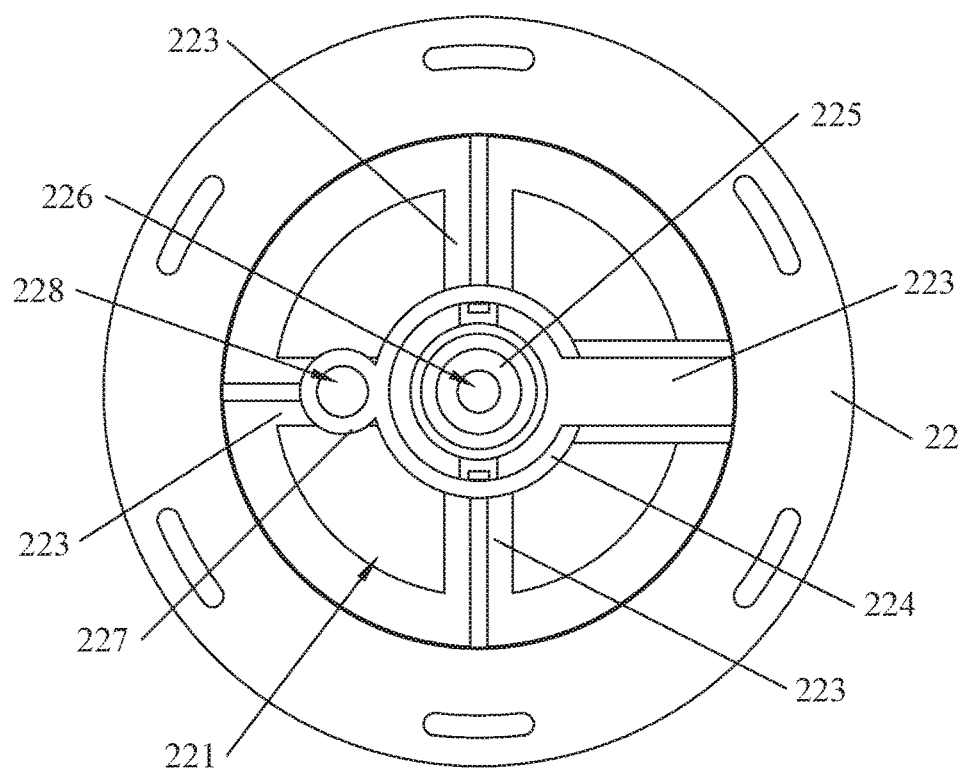
FIG. 9 is a top view of the bottom valve.

Combining with FIG. 5, FIG. 8 and FIG. 9, the air outlet 211 is formed on the bottom valve body 22 and runs through the bottom valve body 22 along up and down directions. A fixing holder is configured in the bottom valve body 22, and the fixing holder is located at the middle position of the air outlet 221 and is fixed to connection arms 223 extended from the side wall of the air outlet 221. In the present embodiment, four connection arms 223 are distributed in the same interval, but the size for each one can be different. The fixing holder includes a ring of outer wall 224 and a shaft 225 positioned in the outer wall 224. A fixing hole 226 is penetrated through the shaft 225 at the middle, which has a reduced diameter at the lower end (as illustrated in FIG. 3). Another shaft 227 having a smaller size is configured at the outside of the outer wall 224, and a guiding recess 228 is formed in the shaft 227 and runs through the bottom valve body 22.

Referring to FIG. 8, the outlet valve includes a sealing plate 25 that is resilient, the sealing plate 25 has a shape that is corresponding to the air outlet. A fixing shaft 26 is fixed in the middle of the sealing plate 25, the lower end of the fixing shaft 26 has an expanded portion 261.

Referring to FIG. 5, the special-shape spring 3 includes a spring body 31 and a push arm 32, the spring body 31 is a helical structure, and the push arm 32 is inverted L-shaped. One end of the push arm 32 is fixed on the top of the spring body 31, and the other end of the push arm 32 is extended downwards and movable up and down along the air valve 2. For example, the special-shape spring 3 can be formed by bending the top wire of a common spring, specifically, the wire is extended downwards and then bent upwards to make the ends of the push arm 32 have smooth contact surface.

Referring to FIG. 3, during the assembly, the fixing shaft 26 of the sealing plate 25 is inserted into the fixing hole 226, causing the expanded portion 261 thereon can be engaged with the fixing hole 226, in such a way, the sealing plate 25 is fixed on the bottom valve 22 and seals the air outlet 221.

The lower end of the spring body 31 is inserted into the outer wall 224 and set around the shaft 225, and the push arm 32 is inserted into the guiding recess 228 and extended towards the sealing plate 25. Specifically, the inner diameter of the guiding recess 228 is slightly larger than the thickness of the push arm 32, thus the push arm 32 may he guided stably during the movement.

Before the top cover 4 is connected with the bottom cover 5, the top surround 42 of the top cover 4 surrounds the top valve body 21 and the bottom surround of the bottom cover 5 surrounds the bottom valve body 22; after the top cover 4 is connected with the bottom cover 5 hermetically, the top valve body 21 is opposite the bottom valve body 22, and the top of the spring body is resiliently pushed against the bottom of the resilient wafer 23 to ensure the tightness of the air inlet 211.

In the air valve 2, the resilient wafer 23 will be slightly opened downwards due to the internal negative pressure, the open motion of the resilient wafer 23 causes the spring body 31 be compressed, and the push arm 32 be moved downwards. When the resilient wafer 23 is opened at a deeper position by manually, the end of the push arm 32 will contact the sealing plate 25, such a position is defined as the deflation position.

When the inflation device is installed in the product, the bottom valve body 22 and the bottom protrusion 51 are located in the interior of the product, and the top valve body 22 and the top protrusion 41 can be protruded on the product. The inflation and the deflation processes will be explained by combination with FIG. 3.

When there is a need to inflate, finger presses the airbag 1, air in the airbag 1 will go through the air passage 11 to enter the air cavity 20 of the air valve 2, at this time, the resilient wafer 23 is pressing to the air inlet 211 under the actions of the spring body 31, the pressing plate 24 and the air positive pressure to keep the tightness; and the rims of the sealing plate 25 are deformed due to the air positive pressure, so that the air outlet 221 is opened, finally the air enter the product. When the airbag 1 is loosen, negative pressure is generated in the interior of the airbag 1 and the air cavity 20, such that the sealing plate 25 is absorbed at the air outlet 221 due to the negative pressure, thus air in the product will not flow back to the air cavity 20. Meanwhile, the resilient wafer 23 will be opened downwards due to the negative pressure, thus air will be entered through the air inlet 211, the air cavity 20 and the air passage 11, finally fills up the airbag 1. Please note, the movement of the resilient wafer 23 is not enough to actuate the push arm 32 to contact the sealing plate 25. After repeated compress and release to the airbag 1, the product can be filled up quickly and simply.

When there is a need to deflate, finger presses the press portion 231 on the resilient wafer 23, causing the resilient wafer 23 to open to the deflating position. When the press is kept on, the push arm 32 will push against the sealing plate 25 to open the air outlet 221. As a result, air in the product can be released through the air outlet 221 and the air inlet 211 and finally released to the outside. The deflation just needs a light press motion applied on the press portion 231, there is no need to insert the finger deep into the air valve 2, thus the deflation process is simplified by comparison with the prior art, in addition, as mentioned above, since the end of the push arm 32 has a smooth contact surface, thus the push arm 32 may not perforate or damage the sealing plate 25.

Figure 2:
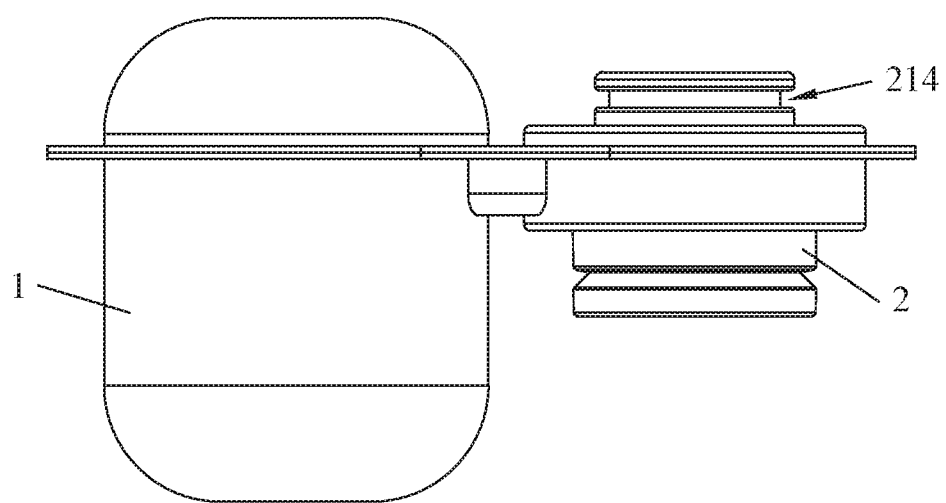
FIG. 2 is a side view of the inflation device.
Figure 10:
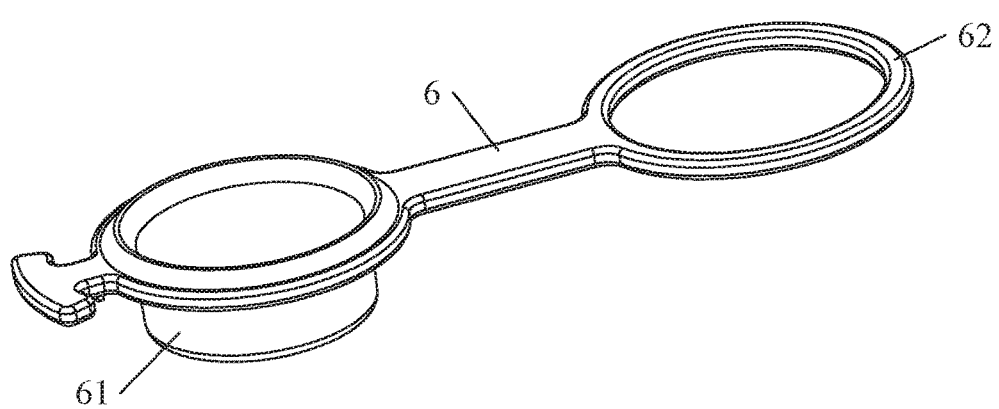
FIG. 10 is a structure view showing the sealing plate according to another embodiment.
Figure 11:
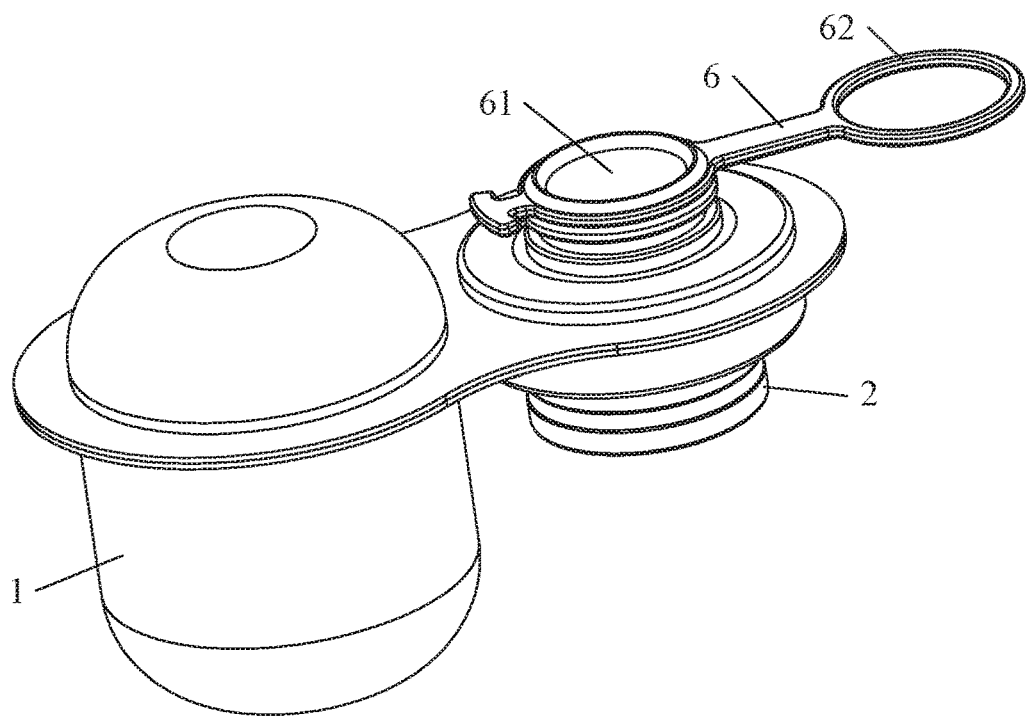
FIG. 11 is a view showing the sealing member seals the air intake.
Figure 12:
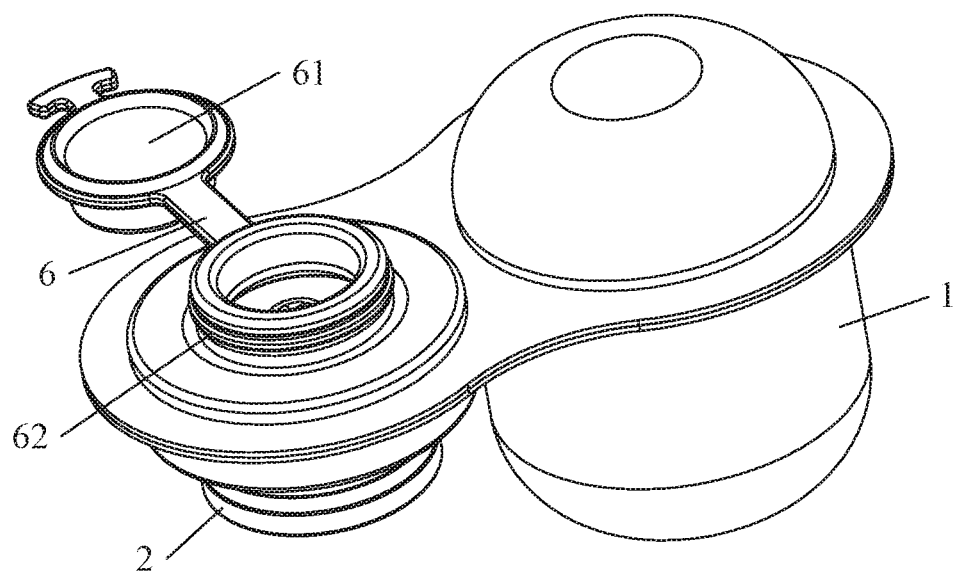
FIG. 12 is a view showing the sealing member is removed from the air intake.

As shown in FIG. 10, in another embodiment, the inflation device further includes a sealing member 6, one end of the sealing member 6 is a stopper 61 that has a shape corresponding to the air inlet 211, and the other end of the sealing member 6 is a ring 62. Referring to FIG. 2, a ring of recess 214 is formed on the top valve body 21. As shown in FIG. 11, the stopper 61 seals the air inlet 211 when there is no need to inflate or deflate; and the stopper 61 is removed when there is a need to inflate or deflate, and the ring 62 is set around the recess 214 to prevent the missing of the sealing member 6.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An inflation device, comprising an airbag and an air valve, wherein an air inlet and an air outlet are provided at opposite ends of the air valve, an inlet valve that is unidirectionally opened inwards the air valve is provided at the air inlet, the inlet valve can be opened to a deflation position, an outlet valve is provided at the air outlet that is unidirectionally opened outwards the air valve, a push arm extending towards the outlet valve is configured in the air valve and is movable between the inlet valve and the outlet valve, the push arm is actuated to move towards the outlet valve if the inlet valve is opened, the push arm is pressed against the outlet valve if the inlet valve is at the deflation position; the air valve comprises a top valve body and a bottom valve body, the air inlet is configured in the top valve body, the air outlet is configured in the bottom valve body, a fixing holder is configured in the bottom valve body and located at a middle position of the air outlet, and a center position of the outlet valve is fixed to the fixing holder which is arranged for sealing the air outlet; and a shaft is configured outside an outer wall of the fixing holder, a guiding recess is formed in the shaft and runs through the bottom valve body, and the push arm is inserted into the guiding recess, a special-shape spring configured in the air valve, wherein the special-shape spring comprises a spring body and the push arm, one end of the push arm is fixed on the spring body, and another end of the push arm is extended towards the outlet valve, the spring body is compressed if the inlet valve is opened.

2. The inflation device according to claim 1, wherein the spring body is a helical structure.

3. The inflation device according to claim 1, wherein one end of the spring body is fixed on the air valve, and the other end of the spring body is extended towards the inlet valve and resiliently pushed against the inlet valve.

4. The inflation device according to claim 1, wherein the push arm is parallel to the spring body.

5. The inflation device according to claim 1, wherein a press portion that is protruded is provided at a top of the inlet valve.

6. The inflation device according to claim 1, wherein the inlet valve includes a resilient wafer, and one end of the resilient wafer is fixed on the air valve, another end of the resilient wafer has a shape that is corresponding to the air inlet.

7. The inflation device according to claim 1, wherein the outlet valve is a sealing plate that is resilient, the sealing plate has a shape that is corresponding to the air outlet, and the middle position of the sealing plate is fixed on the fixing holder.

* * * * *